US008159642B2

(12) United States Patent
Kang

(10) Patent No.: US 8,159,642 B2
(45) Date of Patent: Apr. 17, 2012

(54) IN-PLANE SWITCHING MODE LIQUID CRYSTAL DISPLAY DEVICE HAVING AUXILIARY PIXEL ELECTRODES

(75) Inventor: Byung Koo Kang, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 552 days.

(21) Appl. No.: 11/166,200

(22) Filed: Jun. 27, 2005

(65) Prior Publication Data

US 2006/0146253 A1 Jul. 6, 2006

(30) Foreign Application Priority Data

Dec. 30, 2004 (KR) .................. 10-2004-0117400

(51) Int. Cl.
*G02F 1/1343* (2006.01)
*G02F 1/1337* (2006.01)
(52) U.S. Cl. .................... 349/141; 349/126; 349/146
(58) Field of Classification Search .............. 349/141, 349/123, 126, 129, 139, 146
See application file for complete search history.

(56) References Cited

U.S. PATENT DOCUMENTS

| 6,088,078 | A * | 7/2000 | Kim et al. | 349/141 |
|---|---|---|---|---|
| 6,256,081 | B1 * | 7/2001 | Lee et al. | 349/141 |
| 6,512,565 | B1 * | 1/2003 | Lee et al. | 349/130 |
| 6,642,984 | B1 * | 11/2003 | Yoshida et al. | 349/139 |
| 6,646,707 | B2 * | 11/2003 | Noh et al. | 349/141 |
| 6,661,488 | B1 * | 12/2003 | Takeda et al. | 349/117 |
| 6,819,384 | B2 * | 11/2004 | Nakanishi et al. | 349/141 |
| 6,856,371 | B2 * | 2/2005 | Kim et al. | 349/141 |
| 7,009,673 | B2 * | 3/2006 | Matsumoto et al. | 349/141 |
| 7,317,503 | B2 * | 1/2008 | Lee et al. | 349/141 |
| 2004/0160560 | A1 * | 8/2004 | Kim et al. | 349/129 |
| 2005/0078256 | A1 * | 4/2005 | Hong | 349/141 |

* cited by examiner

*Primary Examiner* — Mark Robinson
*Assistant Examiner* — Paisley L Arendt
(74) *Attorney, Agent, or Firm* — McKenna Long & Aldridge, LLP

(57) ABSTRACT

An in-plane switching (IPS) liquid crystal mode liquid crystal display device that prevents signal interference of a data line and disclination is disclosed. The in-plane switching (IPS) mode liquid crystal display (LCD) device includes first and second substrates; a gate line on the first substrate; a data line crossing the gate line to form a pixel region; a thin film transistor at the crossing of the gate line and the data line; a plurality of pixel electrodes and common electrodes alternately arranged in parallel in an extended direction of the gate line and generating an in-plane field of a first direction; an alignment film rubbed in a direction substantially perpendicular to the data line; and a liquid crystal layer between the first and second substrates, wherein the pixel electrode and the common electrode are bent at both ends thereof and the in-plane field in the first direction is generated from both ends of the pixel electrode and the common electrode.

12 Claims, 7 Drawing Sheets

RUBBING DIRECTION

RUBBING DIRECTION

IN-PLANE SWITCHING MODE LIQUID CRYSTAL DISPLAY DEVICE HAVING AUXILIARY PIXEL ELECTRODES

This application claims the benefit of Korean Patent Application No. 2004-117400, filed on Dec. 30, 2004, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an in-plane switching (IPS) mode LCD capable of preventing signal interference of a data line and reducing vertical line deficiency.

2. Description of the Related Art

As various mobile electronic devices including a mobile phone, a PDA or a notebook computer are being developed, demands for light, thin, short and small flat panel display devices that can be applied to the mobile electronic devices are increasing. As a result, research for flat panel display devices such as an LCD (Liquid Crystal Display), PDP (Plasma Display Panel), an FED (Field Emission Display), a VFD (Vacuum Fluorescent Display) is actively ongoing. Of these displays, the LCD is most spotlighted because of its implementation in mass-production techniques, ease of a driving unit, and high picture quality.

A general LCD device implements an image by controlling light by using an electric field, including a liquid crystal panel on which pixels are arranged in a matrix form and a driving circuit for driving the liquid crystal panel.

FIG. 1 illustrates a unit pixel region of a related art IPS mode LCD. As shown, a gate line 1 and a data line 10 are arranged to cross each other to define a pixel region on a first substrate of the liquid crystal panel. A gate electrode 9, a semiconductor layer (not shown) and source and drain electrodes 13 and 15 are formed at the crossing of the gate line 1 and the data line 10, to form a switching device (e.g., a thin film transistor (TFT).

A pixel electrode 3 and a common electrode 5 are alternately arranged in each pixel region of the liquid crystal panel to generate an in-plane field on the first substrate. The pixel electrode 3 receives a data signal from the source and drain electrodes 13 and 15 of the switching device (TFT) and generates the in-plane field together with the common electrode 5 on the first substrate. In other words, the gate electrode 9 and the source and drain electrodes 13 and 15 are connected with the gate line 1 and the data line 3, respectively, to turn on the switching device (TFT) with a signal input through the gate line 1 and transfer a data signal applied through the data line 3 to the pixel electrode 3. As a result, the LCD displays an image by controlling the light transmittance of a liquid crystal layer with the electric field formed between the pixel electrode 3 and the common electrode 5 according to the data signal supplied to each pixel region.

Though not shown, a color filter layer is formed on a second substrate, and a liquid crystal layer is formed in a separated space between the first and second substrates.

In such an IPS mode LCD, since liquid crystal molecules of the liquid crystal layer are driven by the in-plane field formed between the pixel electrode 3 and the common electrode, a visibility range widens compared to the related art TN (Twisted Nematic) mode LCD, namely, obtaining a viewing angle of about 80°~85° in all directions (up/down and left/right direction).

However, in the related art IPS mode LCD, because the data line 10 and the pixel electrode 3 are adjacent and parallel to each other, a signal interference is easily generated between the data line 10 and the pixel electrode 3, causing crosstalk and light leakage.

Thus, in an effort to solve such a problem, an outermost common electrode 5' is disposed near the data line 10 and has a larger width compared to common electrode 5. However, such an electrode disposition structure degrades an aperture ratio of the LCD and distortion of the electric field due to the signal interference of the data line cannot be effectively prevented.

FIGS. 2A and 2B are enlarged views of the region 'I' in FIG. 1. The distortion of the liquid crystal array due to the signal interference according to a voltage variation of the data line will be described in detail with reference to FIGS. 2A and 2B.

A rubbing direction inducing an initial arrangement of liquid crystal molecules has about a 45° tilt to the common electrode 5 and 5' and the pixel electrode 3, and an in-plane field generated when a voltage is applied to the common electrodes 5 and 5' and the pixel electrode 3 is perpendicular to the common electrodes 5 and 5' and the pixel electrode 3.

FIG. 2A shows that when a voltage of 8V is applied to the data line 10 and voltages of 5V and 8V are respectively applied to the common electrodes 5 and 5' and the pixel electrode 3, a director of liquid crystal molecules is determined in a first direction 30 by an electric field generated due to a voltage difference between the common electrodes 5 and 5' and the pixel electrode 3.

FIG. 2B shows that while a voltage of 8V is applied to the data line 10 and voltages of 5V and 8V are applied to the common electrodes 5 and 5' and the pixel electrode 3, if the 8V applied to the data line 10 is changed to 10V, the direction of the electric field generated on the actual driving region of the liquid crystal molecules is changed to have the second direction 35 such that the director is rotated more than the first direction 30 shown in FIG. 2A.

The voltage change of the data line distorts the direction of the electric field in the pixel region, causing a change in the arrangement of liquid crystals. As a result, although the same voltage is applied to the common electrodes and the pixel electrode, the color sense is changed on a display screen.

SUMMARY OF THE INVENTION

Accordingly, the present invention is directed to an in-plane switching mode liquid crystal display device that substantially obviates one or more of the problems due to limitations and disadvantages of the related art.

An advantage of the present invention is to provide an IPS (In-Plane Switching) mode LCD (Liquid Crystal Display) device capable of preventing degradation of picture quality due to signal interference of a data line by having a rubbing direction substantially perpendicular to a data line and disposing a common electrode and a pixel electrode corresponding to the rubbing direction.

Another advantage of the present invention is to provide an IPS mode LCD device capable of preventing generation of a disclination phenomenon in a pixel by bending both ends of a pixel electrode and a common electrode and additionally forming an auxiliary pixel electrode.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an IPS mode LCD device including: first and second substrates; a gate line on the first substrate; a data line crossing the gate line to form a pixel region; a thin film transistor (TFT) at the crossing of the gate line and the data line; a plurality of pixel electrodes and common electrodes alternately arranged in parallel in an extended direction of the gate line and generating an in-plane field of a first direction; an alignment film rubbed in a direction substantially perpendicular to the data line; and a liquid crystal layer formed between the first and second substrates, wherein the pixel electrode and the common electrode are bent at both ends thereof and the in-plane field in the first direction is generated from both ends of the pixel electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

An LCD device in accordance with the present invention will now be described with reference to the accompanying drawings.

Figure 1:
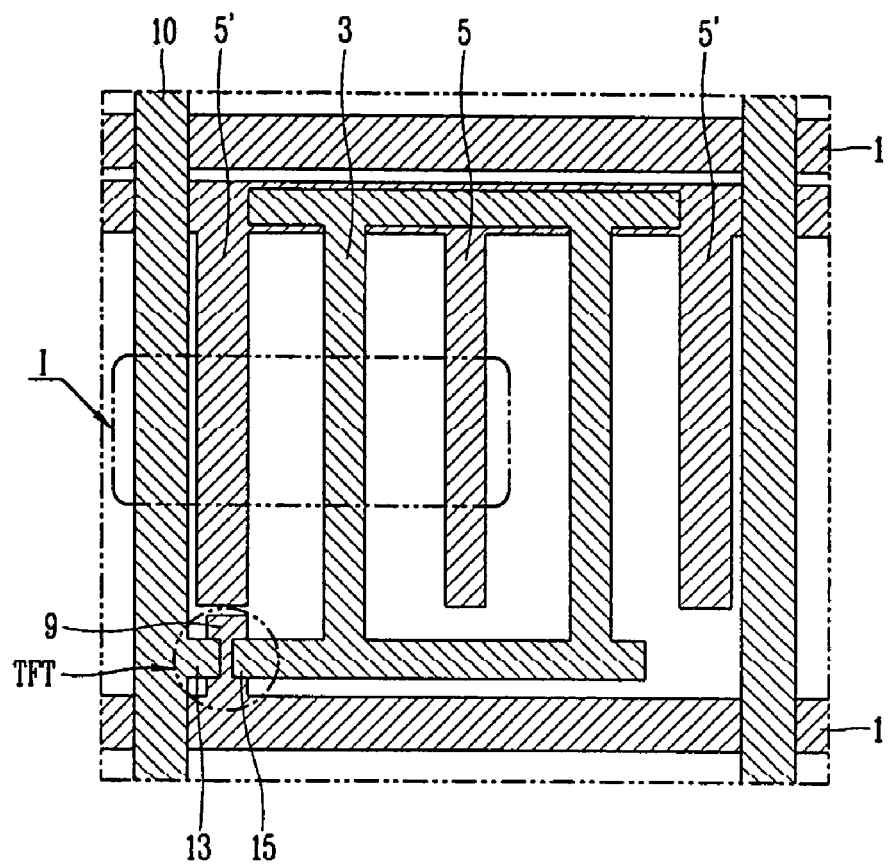
FIG. 1 is a plan view showing a related art LCD device.
Figure 2A:
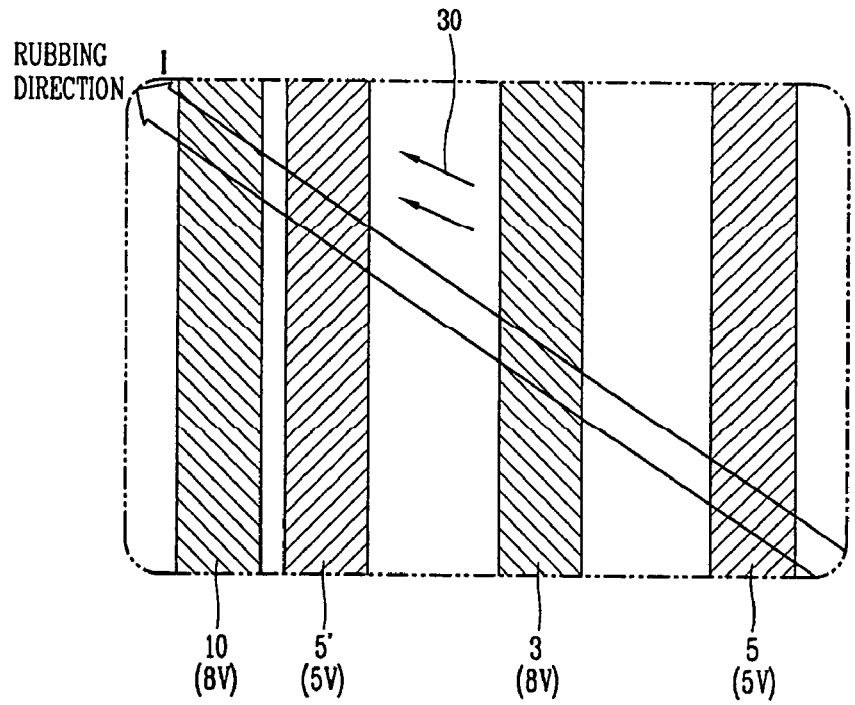
FIGS. 2A and 2B are enlarged views of a portion 'I' of FIG. 1.
Figure 2B:
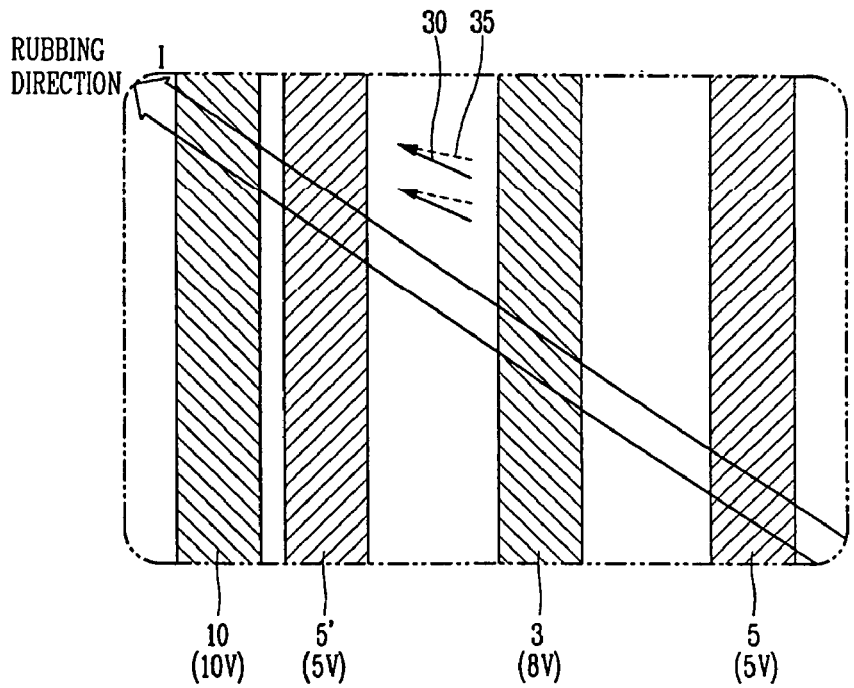
Figure 3:
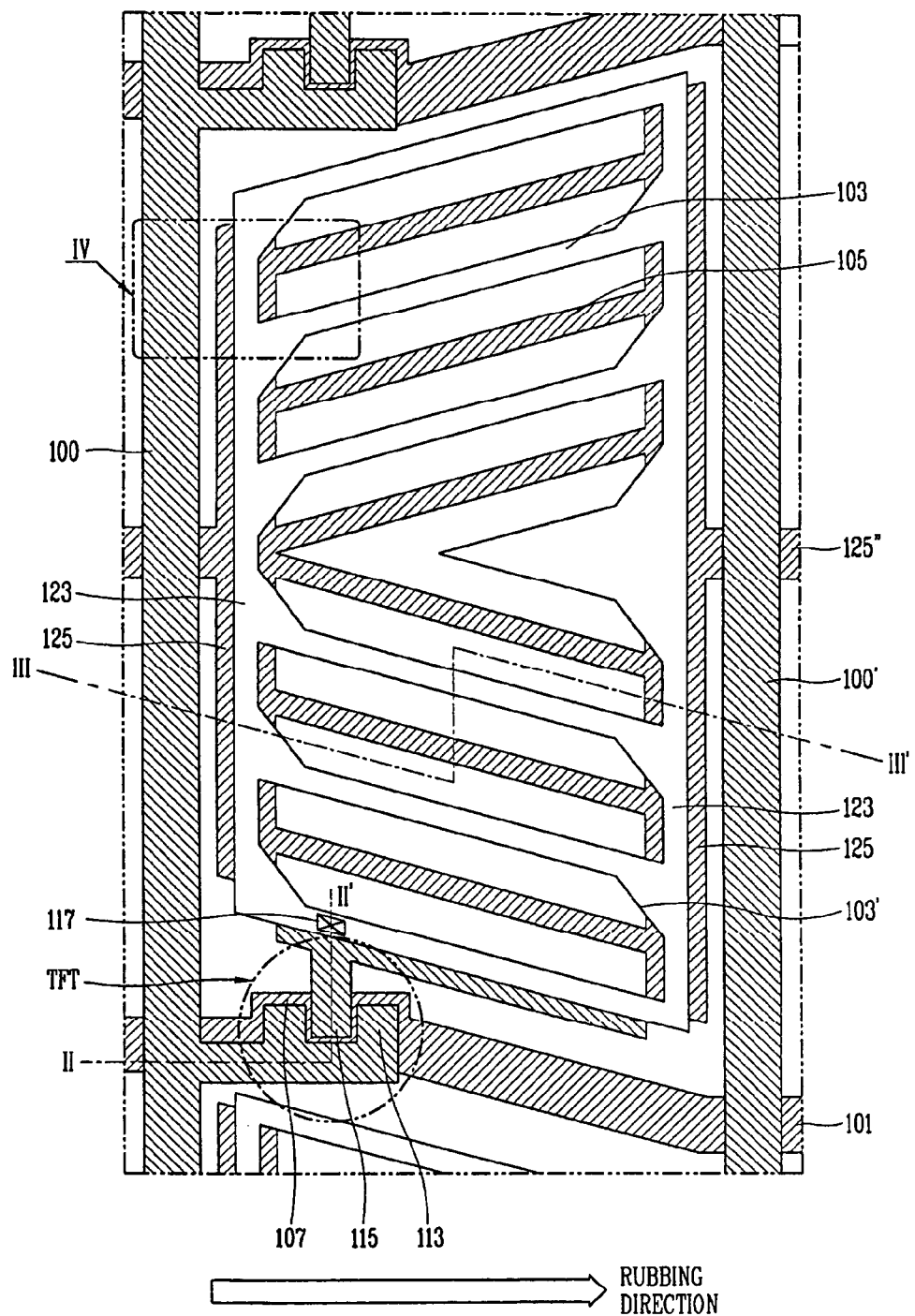
FIG. 3 shows a unit pixel of an LCD device in accordance with a first embodiment of the present invention.
Figure 4A:
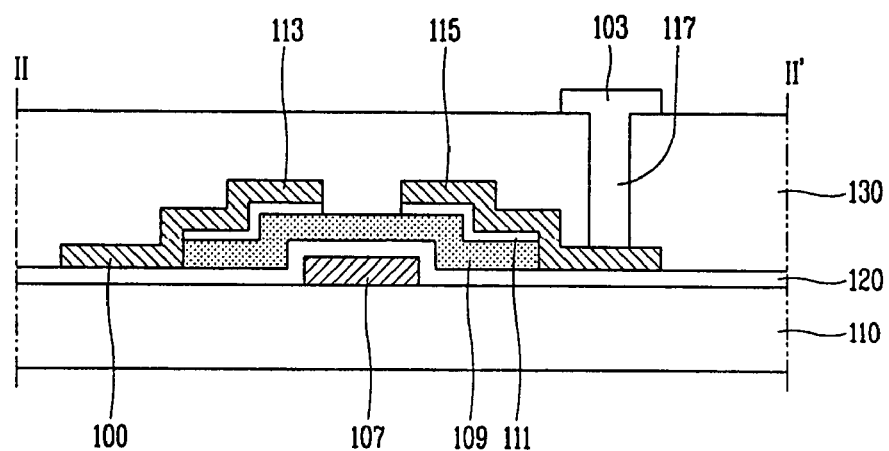
FIGS. 4A and 4B are sectional views taken along lines II-II' and III-III' of FIG. 3.
Figure 4B:
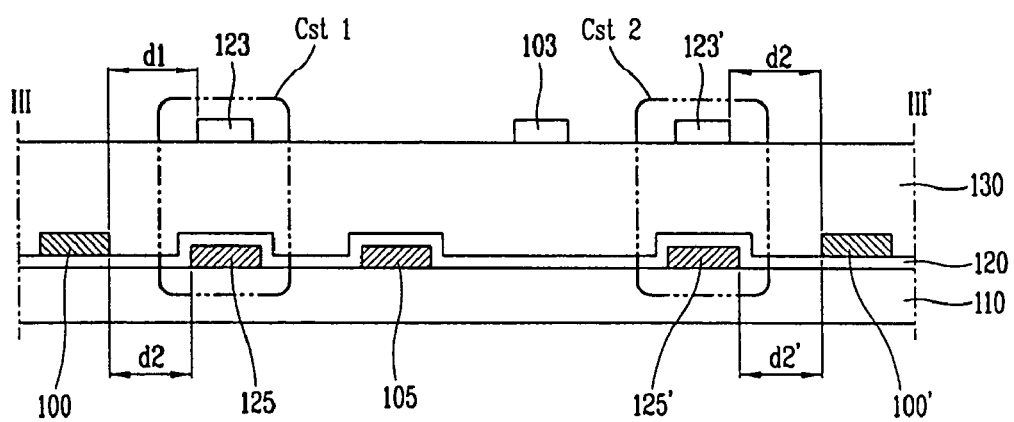

FIG. 3 shows a unit pixel of an LCD device in accordance with a first embodiment of the present invention, and FIGS. 4A and 4B are sectional views taken along lines II-II' and III-III' of FIG. 3.

As illustrated, a liquid crystal panel includes a data line 100 and a gate line 101 arranged on a first substrate 110 and defining a unit pixel region, a switching device specifically, a TFT, disposed at a crossing of the gate line 101 and the data line 100, and at least one pixel electrode 103 and common electrode 105 alternately arranged in parallel in the pixel region and generating an in-plane field. Though not shown, an alignment film rubbed in a direction substantially perpendicular to the data line 200 is coated, and the pixel electrode 103 and the common electrode 105 are formed at a tilt angle of about 0°~45° to the direction perpendicular to the data line 100.

The TFT includes a gate electrode 107 formed as a portion of the gate line 101 on the first substrate 110, a gate insulation film 120 made of SiNx or SiOx formed on the gate electrode 107, a semiconductor layer 109, namely, a channel region, an ohmic contact layer 111 formed on the semiconductor layer 109, a source electrode 113 formed as a portion of the data line 100 extends, and a drain electrode 115 formed spaced apart from the source electrode 113.

A passivation film 130 made of a material such as SiNx or SiOx is formed entirely over the TFT, on which a pixel electrode 103 as a transparent conductor made of ITO (Indium Tin Oxide), IZO (Indium Zinc Oxide) or ITZO (Indium Tin Zinc) is formed and connected to the drain electrode 115 of the TFT through a first contact hole 117 formed in the passivation film 130 to receive a data signal.

At the left and right sides of the unit pixel, a pixel electrode line 123 and a common electrode line 125 are formed substantially in parallel with the adjacent data lines 100 and 100' to electrically connect the plurality of pixel electrodes 103 and common electrodes 105. The common electrode line 125 receives a common signal from an external source through a common line 125" and transfers the signal to the common electrode 105. The common electrode line 125 overlaps the pixel electrode line 123 with the passivation film 130 interposed therebetween to form a storage capacitor (Cst).

Meanwhile, the pixel electrode 103 and the common electrode 105 are disposed symmetrically based on an extended direction of the common line 125" to form the pixel region to have two domains. As such, abnormal light according to birefringence of liquid crystal can offset each other and color shift can be minimized.

The gate line 101 may be formed substantially parallel to the adjacent pixel electrode 103 or common electrode 105 and can extend in a zig-zag pattern over the entire region of the liquid crystal panel. Two adjacent pixel regions can be symmetrically formed at the boundary of the gate line interposed therebetween, and can be symmetrically formed with an adjacent pixel region at the boundary of the data line 100.

On a second substrate (not shown) corresponding to the first substrate 110, there are sequentially formed a light blocking layer for preventing leakage of light, a color filter layer consisting of color filters such as R, G and B and an overcoat layer. The light blocking layer has a minimum width without considering an alignment margin for covering an isolation region between the data line and the common line.

As mentioned above, in the present invention, by disposing the common electrode and the pixel electrode substantially in parallel with the gate line, influence of a signal of the data line on the pixel electrode can be minimized.

Figure 4C:
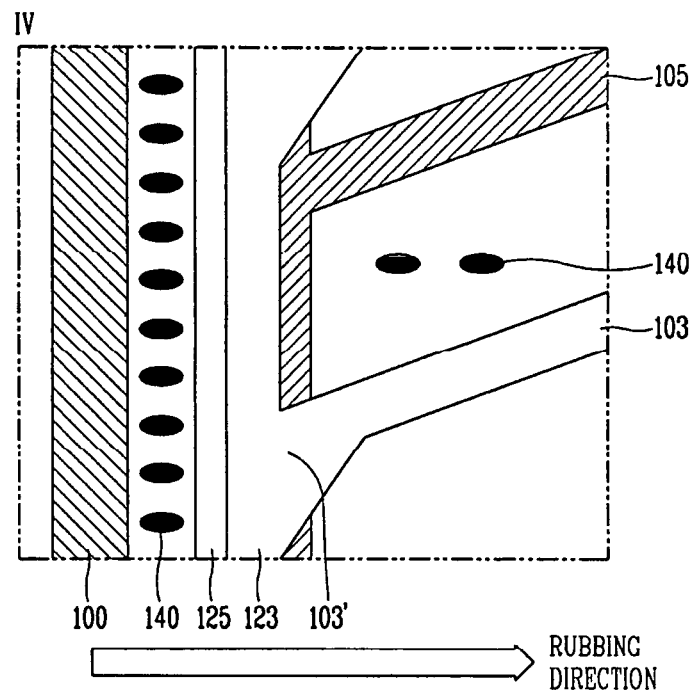
FIGS. 4C and 4D are enlarged views of a portion IV of FIG. 3.
Figure 4D:
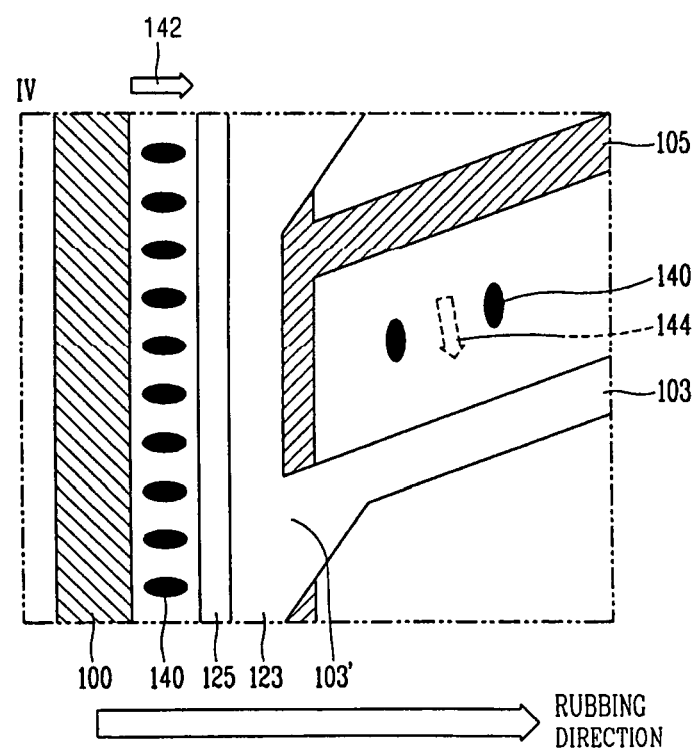

FIGS. 4C and 4D are enlarged views of a portion IV of FIG. 3, showing driving characteristics of liquid crystal molecules when a voltage is applied to the common and pixel electrodes 105 and 103 and when a voltage is not applied thereto.

Though not shown, an alignment film rubbed in the direction perpendicular to the data line 100, namely, in the same direction as electric field 142 formed between the data line 100 and the pixel electrode line 123, is formed on the first substrate 110 including the pixel electrode 103 and the common electrode 105.

In this embodiment of the present invention, the rubbing direction is made such that a rubbing direction inducing an initial arrangement of liquid crystal molecules and the direction of the electric field 142 between the data line 100 and the pixel electrode line 123 when a voltage applied thereto are the same. Specifically, in the related art, the rubbing is performed in the 45°-tilt direction based on the direction of the data line 100. Comparatively, in the present invention, the rubbing is performed in the direction perpendicular to the data line 100, so that when no voltage is applied, liquid crystal molecules 140 positioned between the data line 100 and the pixel electrode line 123 are arranged in the direction perpendicular to the data line 100 and thus not distorted by a residual voltage.

As shown in FIG. 4D, when a voltage is applied to the common electrode 105 and the pixel electrode 103, the liquid crystal molecules 140 are arranged in a direction corresponding to the direction of the in-plane field 144 generated between the common electrode 105 and the pixel electrode 103. In this case, since the electric field 142 is formed in the direction perpendicular to the data line 100 between the data line 100 and the first pixel electrode line 123, the liquid crystal molecules 140 positioned in the section have no movement, an in-plane field 144 is formed between the common electrode 105 and the pixel electrode 103 and the liquid crystal molecules 140 are driven in the direction of the electric field.

As a result, the rubbing direction of the alignment film is made perpendicular to the data line, and the common and pixel electrodes are disposed corresponding to the rubbing direction (for example, at the tilt angle of about 45° with the data line). Accordingly, distortion of the electric field due to the residual voltage of the data line can be minimized and a twisting phenomenon of the liquid crystal molecules can be prevented. Thus, light leakage at a corresponding region can be prevented even in a white black mode.

In the LCD device, as shown in FIG. 3, the common electrode 105 and the common electrode line 125 form an acute angle, and an auxiliary pixel electrode 103' can be additionally included on a protruded region. Namely, a disclination phenomenon can occur at a region where the two electrodes 105 and 125 having the same polarity contact with each other at the acute angle. Thus, by additionally forming the auxiliary electrode 103' at the region, distortion of the electric field can be prevented. In this case, the auxiliary pixel electrode 103' can have a triangular form.

Figure 5:
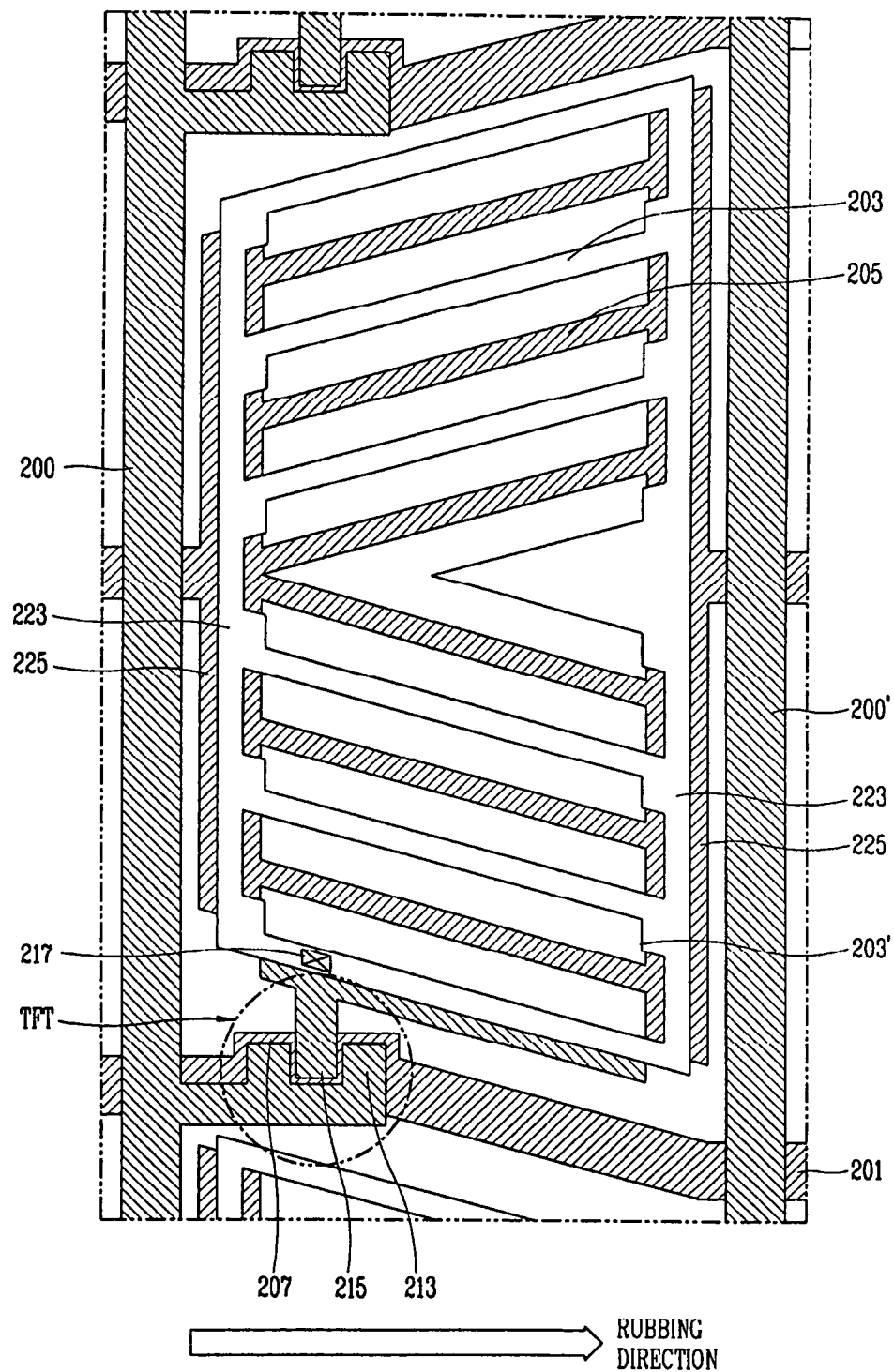
FIG. 5 shows a unit pixel of an LCD device in accordance with a second embodiment of the present invention.

FIG. 5 illustrates a second embodiment of the present invention in which the auxiliary pixel electrode of the first embodiment is modified.

The construction of the second embodiment is similar to that of the first embodiment. So, the differences will be described.

As illustrated, a liquid crystal panel includes a data line 200 and a gate line 201 arranged on a first substrate and defining a unit pixel region, a TFT disposed at crossing of the gate line 201 and the data line 200, and at least one pixel electrode 203 and common electrode 205 alternately arranged substantially to parallel in the pixel region and generating an in-plane field. The pixel electrode 203 and the common electrode 205 are formed at a tilt angle of about 0°~45° in a direction substantially perpendicular to the data line 200.

The TFT includes a gate electrode 207 formed as a portion of the gate line 201, a semiconductor layer (not shown), and a source electrode 213 and a drain electrode 215. The pixel electrode 203 receives a data signal through a first contact hole 217 formed at an upper portion of the drain electrode 215.

At left and right sides of the unit pixel, a pixel electrode line 223 and a common line 225 are formed substantially parallel to the adjacent data lines 200 and 200' to electrically connect the plurality of pixel electrodes 203 and common electrodes 205 respectively. The pixel electrode line 223 and the common line 225 overlap with each other with a gate insulation film (not shown) and a passivation film (not shown) interposed therebetween to form a storage capacitor (Cst).

In this embodiment, the common electrode 205 forms an acute angle with the common line 225, and a parallelogrammic auxiliary pixel electrode 203' for preventing distortion of electric field is additionally formed on the protruded region. The parallelogrammic auxiliary pixel electrode 203' can improve an aperture ratio of the LCD device compared with the triangular auxiliary pixel electrode 103' in accordance with the first embodiment of the present invention.

In addition, on a second substrate (not shown) corresponding to the first substrate, there are sequentially formed a light blocking layer for preventing leakage of light, a color filter layer consisting of R, G and B color filter devices, and an overcoat layer.

Figure 6:
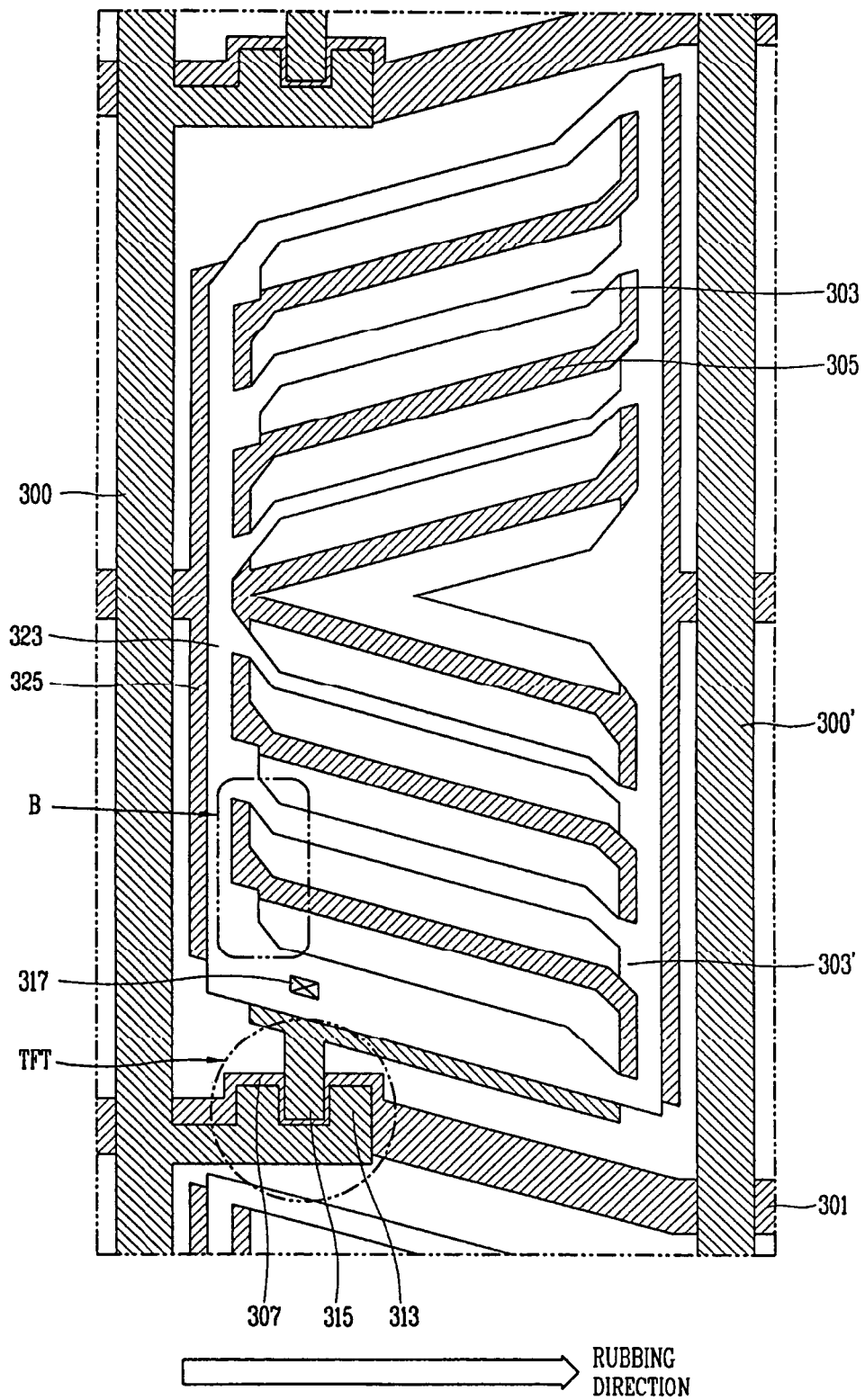
FIG. 6 shows a unit pixel region of an LCD device in accordance with a third embodiment of the present invention.

FIG. 6 shows a unit pixel region of an LCD device in accordance with a third embodiment of the present invention, in which both ends of a pixel electrode and a common electrode in a unit pixel region are bent.

The third embodiment of the present invention is similar to the first and second embodiment of the present invention. So only the differences will be described.

As illustrated in FIG. 6, a liquid crystal panel includes a data line 300 and a gate line 301 arranged on a first substrate and defining a unit pixel region, a TFT disposed at a crossing of the gate line 301 and the data line 300, and at least one pixel electrode 303 and common electrode 305 alternately arranged substantially parallel in the pixel region and generating an in-plane field of a first direction. The pixel electrode 303 and the common electrode 305 are formed at a tilt angle of about 0°~45° in a direction substantially perpendicular to the data line 300. Both end regions (B) of the pixel electrode 303 and the common electrode 305 are bent to have a tilt angle of about a 0°~20° range with the extended direction of the pixel electrode 303 and the common electrode 305.

The TFT includes a gate electrode 307 formed as a portion of the gate line 301, a semiconductor layer (not shown in figure), and a source electrode 313 and a drain electrode 315. The pixel electrode 303 is connected with the drain electrode 315 of the TFT through a first contact hole 317 to receive a data signal.

At left and right sides of the unit pixel, a pixel electrode line 323 and a common line 325 are formed substantially parallel to the adjacent data lines 300 and 300' to electrically connect the plurality of pixel electrodes 303 and common electrodes 305. In this case, the pixel line 323 and the common line 325 overlap with each other with a gate insulation film (not shown) and a passivation film (not shown) interposed therebetween to form a storage capacitor (Cst).

In this embodiment, the common electrode 305 forms an acute angle with the common line 325, and a parallelogrammic auxiliary pixel electrode 303' for preventing distortion of electric field is additionally formed on the protruded region. Thus, disclination is prevented.

In addition, as mentioned above, the common electrode 305 and the pixel electrode 303 are formed such that respective portions connected with the common line 325 and the pixel electrode line 323 are bent to form the inclined electric field-region (B).

The reason of bending the pixel electrode 303 and the common electrode 305 to make them inclined is to minimize formation of an electric field in a different direction from the first direction of the in-plane field, which is generated at the region where the two electrodes 303 and 305 contact with the common line 325 and the pixel electrode line 323, among the region where the in-plane field is formed by the common electrode 305 and the pixel electrode 303.

In detail, since the two electrodes 303 and 305 are not disposed in parallel like those disposed at the center of a pixel, electric field formed at both sides of the common electrode 305 and the pixel electrode 303 is distorted. Thus, liquid crystal molecules are abnormally arranged. Thus, in order to make the two electrodes 303 and 305 disposed to be parallel to their maximum, one side of the pixel electrode 303 or the common electrode 305 is bent to form a slope face at the region (B) where an electric field is formed. Thus, making the first direction of the in-plane field generated at the central region of the pixel and the direction of the in-plane field generated at the outer edge of the electrodes correspond to a maximum.

The IPS mode LCD device in accordance with the present invention has many advantages.

For example, since the rubbing direction is made substantially perpendicular to the data line and the pixel electrode line, liquid crystal molecules positioned near the data line can maintain their initial alignment direction no matter whether a voltage is applied thereto. Thus, although there remains a voltage in the data line in the voltage-OFF state, the liquid crystal does not twist, and thus leakage of light can be prevented. In addition, picture quality can be enhanced by preventing a change of the color sense due to signal distortion of the data line.

Moreover, since both ends of the pixel electrode and the common electrode may be bent and the auxiliary pixel electrode is additionally formed, generation of disclination in the pixel region can be prevented. Thus, picture quality of the liquid crystal panel can be enhanced and an aperture ratio of the LCD device can be maximized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display (LCD) device comprising:
    first and second substrates;
    a gate line on the first substrate;
    a data line crossing the gate line to form a pixel region;
    a thin film transistor (TFT) at the crossing of the gate line and the data line;
    a plurality of pixel electrodes and common electrodes alternately arranged in parallel in an extended direction of the gate line and generating an in-plane field of a first direction;
    a common electrode line substantially parallel to the data line of the pixel region and connecting the plurality of common electrodes, the common electrode line being disposed at both side portions of the data line;
    a pixel electrode line substantially parallel to the data line of the pixel region and connecting the plurality of pixel electrodes, the pixel electrode line being disposed at the both side portions of the data line;
    auxiliary pixel electrodes at end portions of only the pixel electrodes between the common electrodes and the pixel electrodes to prevent generation of disclination by an electric field caused by the acute angle between the common electrodes and the common electrode line, the auxiliary pixel electrodes being integrally formed with the pixel electrodes and the pixel electrode line;
    an alignment film rubbed in a direction substantially perpendicular to the data line and in an oblique direction to the pixel electrodes and the common electrodes; and
    a liquid crystal layer between the first and second substrates,
    wherein the pixel electrodes and the common electrodes are bent at both ends thereof and the in-plane field in the first direction is generated from both ends of the pixel electrodes and the common electrodes and liquid crystal molecules in the liquid crystal layer are aligned parallel to a direction of the in-plane field caused by the data line when a signal is not applied to the pixel electrodes,
    wherein the gate line is bent in each pixel region, and
    wherein each of the pixel electrodes are formed in a rectangular shape having two parallel sides and two end portions, and the auxiliary pixel electrodes are respectively disposed at the two end portions and opposite sides of the two parallel sides so that two auxiliary pixel electrodes are disposed at every area between the pixel electrodes and the common electrodes.

2. The device of claim 1, wherein the pixel electrodes and the common electrodes are formed at a tilt angle of about a 0°~45° range based on a direction perpendicular to the data line.

3. The device of claim 1, wherein the common electrode line and the pixel electrode line overlap to form a storage capacitor.

4. The device of claim 1, wherein the common electrode line transfers a common signal to the common electrodes externally.

5. The device of claim 1, wherein the common electrodes and the pixel electrodes are symmetrically arranged based on the common electrode line to form two domains in the pixel region.

6. The device of claim 1, wherein the gate line is substantially parallel to the common electrodes and pixel electrodes and extends in a zig-zag pattern.

7. The device of claim 1, wherein the pixel region is symmetrical to a neighboring pixel region at a boundary of the gate line.

8. The device of claim 1, wherein the common electrodes and the pixel electrodes in one pixel region are symmetrical with those of a neighboring pixel region with respect to the data line.

9. The device of claim 1, wherein the pixel electrodes are formed as a transparent conductor made of ITO (Indium Tin Oxide), IZO (Indium Zinc Oxide) or ITZO (Indium Tin Zinc Oxide).

10. The device of claim 1, wherein the TFT includes a gate electrode, a semiconductor layer, a source electrode and a drain electrode.

11. The device of claim 1, further comprising a first contact hole electrically connecting the drain electrode and the pixel electrodes.

12. The device of claim 1, wherein the auxiliary pixel electrodes are formed in a triangular shape.

* * * * *